United States Patent [19]

Eichenauer et al.

[11] Patent Number: 5,658,985
[45] Date of Patent: Aug. 19, 1997

[54] ABS MOULDING COMPOUNDS WITH IMPROVED YIELD STRESS

[75] Inventors: Herbert Eichenauer, Dormagen; Alfred Pischtschan, Kuerten; Karl-Heinz Ott, Leverkusen, all of Germany

[73] Assignee: Bayer AG, Leverkusen, Germany

[21] Appl. No.: 603,016

[22] Filed: Feb. 16, 1996

Related U.S. Application Data

[63] Continuation of Ser. No. 234,729, Apr. 28, 1994, abandoned, which is a continuation of Ser. No. 559,721, Jul. 30, 1990, abandoned.

[30] Foreign Application Priority Data

Aug. 9, 1989 [DE] Germany .................. 39 26 275.8

[51] Int. Cl.$^6$ .................. C08L 23/16; C08L 33/18; C08L 9/04; C08L 9/08
[52] U.S. Cl. .................. 525/83; 525/80; 525/84; 525/227; 525/232; 525/233; 525/238; 525/240; 525/241
[58] Field of Search .................. 525/240, 238, 525/241, 227, 232, 233, 80, 83, 84

[56] References Cited

U.S. PATENT DOCUMENTS

| | | | |
|---|---|---|---|
| 2,802,808 | 8/1957 | Hayes | 525/73 |
| 4,000,219 | 12/1976 | Smejkal | 525/84 |
| 4,163,032 | 7/1979 | Liebig et al. | 525/74 |
| 4,267,278 | 5/1981 | Lindner et al. | 525/2 |
| 4,297,446 | 10/1981 | Lindner et al. | 525/83 |
| 4,302,378 | 11/1981 | Lindner et al. | 525/85 |
| 4,316,825 | 2/1982 | Wirth | 525/240 |
| 4,412,896 | 11/1983 | Lemattre et al. | 204/159.2 |
| 4,742,116 | 5/1988 | Schopers et al. | 525/74 |
| 4,849,473 | 7/1989 | Cisna et al. | 525/86 |
| 4,885,337 | 12/1989 | Eichenauer et al. | 525/75 |
| 5,210,135 | 5/1993 | Eichenauer et al. | 525/71 |

FOREIGN PATENT DOCUMENTS 2141432  12/1984  United Kingdom .

OTHER PUBLICATIONS

Encyclopedia of Chemical Technology, vol. 8, p. 499 (John Wiley & Sons) Dec. 1979.
Polymer Handbook, Brandrup, J. and Immergut, E. H., Dec., 1975. pp. V–1, 2, 13, 16, 23 and 24.
Encyclopedia of Polymer Science and Engineering, vol. 6, John Wiley & Sons, Dec. 1986, p. 531.

Primary Examiner—W. Robinson H. Clark
Attorney, Agent, or Firm—Connolly and Hutz

[57] ABSTRACT

Thermoplastic molding composition, containing: A) 5–95 weight percent of a thermoplastic homo-, co-, or terpolymer of styrene, alpha-methylstyrene, ring-substituted styrene, methyl methacrylate, acrylonitrile, methacrylonitrile, maleic anhydride, N-substituted maleimide, vinyl acetate or mixtures thereof; B) 5–95 weight % of a graft polymer of B.1) 5–90 parts by weight of styrene, alpha-methylstyrene, ring-substituted styrene, methyl methacrylate, acrylonitrile, methacrylonitrile, maleic anhydride, N-substituted maleimide, vinyl acetate or mixtures thereof on B.2) 95–10 parts by weight of a rubber with a glass transition temperature $\leq 10°$ C; and C) 0.1–10 parts bye weight per 100 parts by weight of A+B of one or more EPM and/or EPDM rubbers.

6 Claims, No Drawings

ABS MOULDING COMPOUNDS WITH IMPROVED YIELD STRESS

This application is a continuation of application Ser. No. 08/234,729 filed on Apr. 28, 1994, now abandoned, which is a continuation of application Ser. No. 07/559,721 filed Jul. 30, 1990, now abandoned.

ABS polymers are chemical materials which are outstanding for their well-balanced tenacity, deflection temperature under loads processability and surface quality. If one property, e.g. the tenacity or the deflection temperature under load, is improved, the result is very commonly losses for other properties.

The production of ABS materials with good tenacity, high yield stress and good processability represents a special problem: the measures suitable for raising the tenacity, such as increasing the graft rubber content or the molecular weight of the styrene/acrylonitrile copolymer resin matrix, lead simultaneously to a large reduction of the stiffness or to a distinctly worsened thermoplastic processability as a result of a large increase of the melt viscosity.

The addition of small amounts of silicone oil as proposed in EP-A 6521 for improving the tenacity leads in the tensile test to a distinct deterioration of the yield stress, through which on demoulding the corresponding mouldings made by injection moulding, white discolorations can appear.

It has been found that ABS materials with good tenacity, easy processability and high yield stress are obtained while preserving the other characteristic properties of ABS polymers through the addition of special co- or terpolymers.

Thermoplastic moulding compounds are the subject matter of the invention, containing A) 5–95 weight %, preferably 10–90 weight % and especially 20–75 weight % of a thermoplastic homo-, co- or terpolymer of styrene, alpha-methylstyrene, ring-substituted styrene, methyl methacrylate, acrylonitrile, methacrylonitrile, maleic anhydride, N-substituted maleimide, vinyl acetate or mixtures thereof, B) 5–95 weight %, preferably 10–90 weight % and especially 25–80 weight % of a graft polymer of B.1) 5–90 parts by weight, preferably 30–80 parts by weight of styrene, alpha-methylstyrene, ring-substituted styrene, methyl methacrylate, acrylonitrile, methacrylonitrile, maleic anhydride, N-substituted maleimide, vinyl acetate or mixtures thereof on B.2) 95–10 parts by weight, preferably 70–20 parts by weight, of a rubber with a glass transition temperature $\leq 10°$ C. and c) 0.1–10 parts by weight, preferably 0.5–7.5 parts by weight and especially 0.75–5 parts by weight per 100 parts by weight A+B of one or more EPM and/or EPDM rubbers To the blends according to the invention can be added the usual additives such as flame retardants, stabilizers, mould release agents, pigments, lubricants, antistatic agents and fillers in the usual amounts.

Through the addition of the rubber C), moulding compounds of the ABS type are produced which show, in addition to good tenacity and easy processability, a high yield stress.

This means that by thermoplastic processing of the moulding compounds according to the invention, tough injection mouldings can easily be obtained which show no white discoloration on demoulding.

Thermoplastic polymers A) which are suitable according to the invention are those from styrene, alpha-methylstyrene, p-methylstyrene, vinyltoluene, halogenostyrene, methyl acrylate, methyl methacrylate, acrylonitrile, maleic anhydride, N-substituted maleimide or mixtures thereof.

The polymers A) are resinous, thermoplastic and rubber-free. Especially preferred polymers A) are those from styrene, methyl methacrylate, styrene/ acrylonitrile mixtures, styrene/acrylonitrile/methyl methacrylate mixtures, styrene/methyl methacrylate mixtures, acrylonitrile/methyl methacrylate mixtures, alpha-methylstyrene/acrylonitrile mixtures, styrene/ alpha-methylstyrene/acrylonitrile mixtures, alpha-methylstyrene/methyl methacrylate/acrylonitrile mixtures, styrene/alpha-methylstyrene/methyl methacrylate mixtures, styrene/alpha-methylstyrene/ methyl methacrylate/acrylonitrile mixtures, styrene/maleic anhydride mixtures, methyl methacrylate/maleic anhydride mixtures, and styrene/methyl methacrylate/ maleic anhydride mixtures.

The polymers A) are known and can be produced by radical polymerization, especially by emulsion, suspension, solution or bulk polymerization. They preferably have molecular weights $\overline{M}_w$ of 20,000 to 200,000 or intrinsic viscosities [η] of 20 to 110 ml/g (measured in dimethylformamide at 25° C.).

Suitable rubbers for the production of graft polymers B) are especially polybutadiene, butadiene/styrene copolymers, butadiene/acrylonitrile copolymers, polyisoprene or alkyl acrylate rubbers based on $C_1$–$C_8$ alkyl acrylates, especially ethyl, butyl and ethylhexyl acrylates.

The acrylate rubbers can possibly contain up to 30 weight % (relative to the rubber weight) of copolymerized monomers such as vinyl acetate, acrylonitrile, styrene, methyl methacrylate and/or vinyl ethers. They can also contain small amounts, preferably up to 5 weight % (relative to the rubber weight) of polymerized-in ethylenically unsaturated monomers with crosslinking action. Crosslinkers are e.g. alkylene diol diacrylates and methacrylates, polyester diacrylates and methacrylates, divinylbenzene, trivinylbenzene, triallyl cyanurate, allyl acrylate and methacrylate, butadiene or isoprene. Acrylate rubbers as grafting base can also contain a crosslinked diene rubber from one or more conjugated dienes, such as polybutadiene, or a copolymer of a conjugated diene with an ethylenically unsaturated monomer, such as styrene and/or acrylonitrile, as core.

Preferred rubbers for the production of graft polymers B) are diene and alkyl acrylate rubbers.

The rubbers occur in the graft polymer B) in the form of at least partially crosslinked particles of a mean particle diameter of ($d_{50}$) 0.05 to 20.0 microns, preferably of 0.1 to 2.0 microns and especially of 0.1 to 0.8 microns. The mean particle diameter $d_{50}$ is determined by ultracentrifuge measurements following W. Scholtan et al., Kolloid-Z. u.Z. Polymere 250 (1972), 782–796.

The graft polymers B) can be produced by radical graft polymerization of the monomers B.1) in presence of the rubbers B.2) to be grafted onto.

Preferred production processes for the graft polymers B) are emulsion, solution, bulk or suspension polymerization as well as known combinations of these processes. Especially preferred graft polymers B) are the so-called ABS polymers.

Suitable as C) are rubbers which are built up from ethylene, propylene and preferably in addition a non-conjugated diene. As non-conjugated dienes may be mentioned e.g. dicyclopentadiene, ethylidenenorbornene, 1,4-hexadiene, 1,4-cycloheptadiene and 1,5-cyclooctadiene.

The molar ratio ethylene: propylene is preferably 5:1 to 1:3; the diene is incorporated in such amounts as to result in 0 to 20 double bonds per 1,000 C atoms, preferably 4 to 16 double bonds per 1,000 C atoms.

The rubbers can be amorphous, partially crystalline or crystalline. The rubbers are in general produced by Ziegler-Natta polymerization; they are known as EPM rubbers or EPDM rubbers.

Especially preferred mixtures consist of

A': 90–20 weight % of a thermoplastic resin from 5–40 parts by weight acrylonitrile and 95–60 parts by weight styrene, alpha-methylstyrene, p-methylstyrene, methyl methacrylate or mixtures thereof, B') 10–80 weight % of a graft polymer of 30–80 parts by weight of styrene, alpha-methylstyrene, p-methylstyrene, methyl methacrylate, acrylonitrile or mixtures thereof on 70–20 parts by weight of polybutadiene and c) 0.5–5 parts by weight per 100 parts by weight A+B of one or more EPDM rubbers.

The blends according to the invention, containing A), B) and C) and possibly the usual additives such as lubricants, stabilizers, pigments, mould release agents, antistatic agents and fillers are produced by mixing the constituents in known manner simultaneously or successively at room temperature or higher temperature and then melt-compounding or melt-extruding at 150° C. to 300° C. in commonly used units such as internal kneaders, extruders or double-shaft screws.

The moulding compounds of the invention can be used for the production of mouldings of any kind, using usual production methods: mouldings can be produced in particular by injection moulding.

Another form of processing of the moulding compounds according to the invention is the production of mouldings by drawing from sheets or films produced previously by known processes.

EXAMPLES

Polymer Components

Thermoplastic Resin A

Statistical styrene/acrylonitrile=72:28-copolymer with a $\overline{M}_w$ of ca. 115,000 and a non-uniformity $\overline{M}_w/\overline{M}_n - 1 \leq 2.0$ Graft polymer—$B_1$ Grafted product obtained by emulsion polymerization of 50 weight % of a styrene/acrylonitrile mixture (weight ratio 72:28) on 50 weight % particulate polybutadiene with a mean particle diameter ($d_{50}$) of 0.4 microns. Working up by coagulation of the latex with an acetic acid/magnesium sulphate mixture followed by drying in vacuo.

Graft polymer—$B_2$

Grafted product obtained by emulsion polymerization of 50 weight % of a styrene/acrylonitrile mixture (weight ratio 72:28) on 50 weight % particulate polybutadiene with a mean particle diameter ($d_{50}$) of 0.1 microns. Work-up as described under B1.

Rubber C1

EPDM rubber Buna AP 251 (Buna-Werke Hüls), ethylene content 50 weight %, diene:ethylidenenorbornene, double bond content/1000 C atoms=14, Mooney viscosity ML (1+4) 100° C.=45.

Rubber C2

EPDM rubber Buna AP 321 (Buna-Werke Hüls), ethylene content 50 weight %, diene:dicyclopentadiene, double bond content/1000 C atoms=8, Mooney viscosity ML (1+4) 100° C.=60.

Rubber C3

EPDM rubber Buna AP 331 (Buna-Werke Hüls), ethylene content 50 weight %, diene:ethylidenenorbornene, double bond content/1000 C atoms=4, Mooney viscosity ML (1+4) 100° C.=70.

Rubber C4

EPDM rubber Buna AP 447 (Buna-Werke Hüls), ethylene content 70 weight %, diene:ethylidenenorbornene, double bond content/1000 C atoms=8, Mooney viscosity ML (1+4) 100° C.=85.

Rubber C5

EPDM rubber Buna AP 521 (Buna-Werke Hüls), ethylene content 50 weight %, diene:dicyclopentadiene, double bond content/1000 C atoms=8, Mooney viscosity ML (1+4) 100° C.=100.

Rubber C6

EPDM rubber Buna AP 541 (Buna-Werke Hüls), ethylene content 50 weight %, diene: ethylidenenorbornene, double bond content/1000 C atoms=8, Mooney viscosity ML (1+4) 100° C.=110.

A), B), and C) were compounded with 2 parts by weight ethylenediamine bisstearylamide as lubricant in a 1.3 litre internal kneader at temperatures of 160° to 200° C. The mouldings were produced on an injection moulding machine at 240° C.

The notch impact strength ($a_k$) was determined at room temperature according to DIN 53456 (unit kJ/m$^2$); and the yield stress ($\sigma$s) by tensile test according to DIN 53455. The thermoplastic processability was characterized by measurement of the required filling pressure at 240° C. (see F. Johannaber, Kunststoffe 74 (1984), 1, pages 2–5).

The compositions of the moulding compounds examined are assembled in Table 1, and the values measured in Table 2.

Compared with the comparative tests the mixtures according to the invention show good tenacity and high yield stress with very good thermoplastic processability. Addition of a silicone oil according to EP-A 6521 indeed gives good tenacity, but yield stress and processability clearly decline.

TABLE 1

| | Compositions of the Moulding Compounds | | | | | | | | | |
|---|---|---|---|---|---|---|---|---|---|---|
| Example No. | A parts wt. | B1 parts wt. | B2 parts wt. | C1 parts wt. | C2 parts wt. | C3 parts wt. | C4 parts wt. | C5 parts wt. | C6 parts wt. | Silicone oil parts wt. |
| 1 | 80 | 10 | 10 | — | — | 1.1 | — | — | — | — |
| 2 (comparison) | 80 | 10 | 10 | — | — | — | — | — | — | — |
| 3 (comparison) | 80 | 10 | 10 | — | — | — | — | — | — | 0.1 |
| 4 | 70 | 15 | 15 | 1.5 | — | — | — | — | — | — |
| 5 | 70 | 15 | 15 | 3 | — | — | — | — | — | — |

TABLE 1-continued

Compositions of the Moulding Compounds

| Example No. | A parts wt. | B1 parts wt. | B2 parts wt. | C1 parts wt. | C2 parts wt. | C3 parts wt. | C4 parts wt. | C5 parts wt. | C6 parts wt. | Silicone oil parts wt. |
|---|---|---|---|---|---|---|---|---|---|---|
| 6 | 70 | 15 | 15 | — | 1.5 | — | — | — | — | — |
| 7 | 70 | 15 | 15 | — | — | 0.55 | — | — | — | — |
| 8 | 70 | 15 | 15 | — | — | 1.65 | — | — | — | — |
| 9 | 70 | 15 | 15 | — | — | — | 1.5 | — | — | — |
| 10 | 70 | 15 | 15 | — | — | — | — | 1.5 | — | — |
| 11 | 70 | 15 | 15 | — | — | — | — | — | 1.5 | — |
| 12 (comparison) | 70 | 15 | 15 | — | — | — | — | — | — | — |
| 13 (comparison) | 70 | 15 | 15 | — | — | — | — | — | — | 0.1 |
| 14 | 60 | 20 | 20 | — | — | 1.1 | — | — | — | — |
| 15 (comparison) | 60 | 20 | 20 | — | — | — | — | — | — | — |
| 16 (comparison) | 60 | 20 | 20 | — | — | — | — | — | — | 0.1 |

TABLE 2

Test Data for the Moulding Compounds

| Example no. | Notch impact strength $a_k$ at 20° C. [kJ/m$^2$] | Yield stress ($\sigma s$) [N/mm$^2$] | Filling pressure [bar] |
|---|---|---|---|
| 1 | 4 | 58.5 | 274 |
| 2 (comparison) | 4 | 56.1 | 283 |
| 3 (comparison) | 5 | 53.2 | 286 |
| 4 | 12.5 | 51.5 | 281 |
| 5 | 13 | 49.0 | 277 |
| 6 | 10 | 50.3 | 299 |
| 7 | 10 | 53.0 | 301 |
| 8 | 10.5 | 52.2 | 295 |
| 9 | 10.5 | 49.4 | 297 |
| 10 | 9.5 | 49.7 | 296 |
| 11 | 10 | 50.6 | 295 |
| 12 (comparison) | 9 | 52.8 | 306 |
| 13 (comparison) | 11 | 47.3 | 312 |
| 14 | 14.5 | 47.5 | 319 |
| 15 (comparison) | 11 | 48.8 | 328 |
| 16 (comparison) | 14.5 | 42.8 | 332 |

We claim:

1. Thermoplastic moulding compounds consisting essentially of

A) 90–20 weight % of thermoplastic resin from 5–40 parts by weight of acrylonitrile and 95–60 parts by weight of styrene, alpha-methylstyrene, p-methylstyrene, methyl methacrylate or their mixtures, B) 10–80 weight % of a graft polymer of 30–80 parts by weight of styrene, alpha-methylstyrene, p-methylstyrene, methyl methacrylate, acrylonitrile or their mixtures on 70–20 parts by weight of polybutadiene and C) 0.5–5 parts by weight per 100 parts by weight of A+B of one or more EPDM rubbers.

2. Moulding compounds according to claim 1, in which C is an EPDM rubber with a double bond content of 4 to 16 double bonds per 1,000 C atoms.

3. Thermoplastic moulding compounds consisting of:

A) 90–20 weight % of thermoplastic resin from 5–40 parts by weight of acrylonitrile and 95–60 parts by weight of styrene, alpha-methylstyrene, p-methylstyrene, methyl methacrylate or their mixtures, B) 10–80 weight % of a graft polymer of 30–80 parts by weight of styrene, alpha-methylstyrene, p-methylstyrene, methyl methacrylate, acrylonitrile or their mixtures on 70–20 parts by weight of weight of polybutadiene and C) 0.5–5 parts by weight per 100 parts by weight of A+B of one or more EPDM rubbers; and D) optionally one or more additives selected from the group consisting of lubricants, stabilizers, pigments, mold release agents, antistatic agents and fillers.

4. The molding compound of claim 3, wherein C) is an EPDM rubber with a double bond content of 4 to 16 double bonds per 1,000 C atoms.

5. A thermoplastic molding compound as claimed in claim 3 consisting of 60–80 parts of A), 10–20 parts of B), and 1.1–3 parts of C).

6. A thermoplastic molding compound as claimed in claim 5, wherein A) is a styrene/acrylonitrile copolymer and B) is a graft product formed by emulsion polymerization of a styrene/acrylonitrile mixture onto particulate polybutadiene.

* * * * *